(12) United States Patent
MacCall et al.

(10) Patent No.: US 6,850,944 B1
(45) Date of Patent: Feb. 1, 2005

(54) SYSTEM, METHOD, AND COMPUTER PROGRAM PRODUCT FOR MANAGING ACCESS TO AND NAVIGATION THROUGH LARGE-SCALE INFORMATION SPACES

(75) Inventors: Steven Leonard MacCall, Tuscaloosa, AL (US); Ian Eric Gibson, Cottondale, AL (US); David Jerel McMillan, Duncanville, AL (US)

(73) Assignee: The University of Alabama, Tuscaloosa, AL (US)

( * ) Notice: Subject to any disclaimer, the term of this patent is extended or adjusted under 35 U.S.C. 154(b) by 479 days.

(21) Appl. No.: 09/715,175

(22) Filed: Nov. 20, 2000

(51) Int. Cl.⁷ .............................................. G06F 17/30
(52) U.S. Cl. ............................ 707/100; 707/9; 707/10; 709/225
(58) Field of Search ............................. 707/1, 10, 100, 707/104.1, 2, 3, 4, 9, 201; 709/203, 328, 223, 224, 225, 226; 345/853, 855

(56) References Cited

U.S. PATENT DOCUMENTS

| | | | | |
|---|---|---|---|---|
| 5,940,821 A | * | 8/1999 | Wical | 707/3 |
| 6,161,126 A | * | 12/2000 | Wies et al. | 709/203 |
| 6,317,787 B1 | * | 11/2001 | Boyd et al. | 709/224 |
| 6,321,251 B1 | * | 11/2001 | Deisinger et al. | 709/203 |
| 6,353,831 B1 | * | 3/2002 | Gustman | 707/103 R |
| 6,356,899 B1 | * | 3/2002 | Chakrabarti et al. | 707/5 |
| 6,363,378 B1 | * | 3/2002 | Conklin et al. | 707/5 |
| 6,366,906 B1 | * | 4/2002 | Hoffman | 707/3 |
| 6,424,973 B1 | * | 7/2002 | Baclawski | 707/102 |
| 6,434,556 B1 | * | 8/2002 | Levin et al. | 707/5 |
| 6,466,975 B1 | * | 10/2002 | Sterling | 709/223 |
| 6,505,238 B1 | * | 1/2003 | Tran | 709/208 |
| 6,507,872 B1 | * | 1/2003 | Geshwind | 709/236 |
| 6,546,393 B1 | * | 4/2003 | Khan | 707/10 |
| 6,598,043 B1 | * | 7/2003 | Baclawski | 707/3 |

OTHER PUBLICATIONS

Thomas Mann, Library Research Models, A Guide to Classification, Cataloging, and Computers, 1993, pp. 90–101.
John Fieber, Browser Caching and Web Log Analysis, School of Library and Information Science, Indiana University, pp. 1–16, Oct. 18, 2000.
Thomas S. Wurster, Getting Real About Virtual Commerce, Nov., 1999/ Dec. 1999, Harvard Business Review, pp. 3–16.

* cited by examiner

*Primary Examiner*—Greta Robinson
*Assistant Examiner*—Cheryl Lewis
(74) *Attorney, Agent, or Firm*—Oblon, Spivak, McClelland, Maier & Neustadt, P.C.

(57) ABSTRACT

A system, method and computer program product for managing access to and navigating through large-scale information spaces. A digital library is created by maintaining an ontological hierarchy in a database. Content is accessible through links to resources available over a communications network, such as the Internet. Librarians tailor the accessibility of content of the library as well as the view into the library that is presented to their user population to meet the specialized needs of their users. Content available via the library may be privileged according to qualitative feedback from users maintained within the digital library. An exactly-correct server log tracks the traversal of users through the digital library. The functionality of the digital library is accessible via an application program interface.

36 Claims, 10 Drawing Sheets

SYSTEM, METHOD, AND COMPUTER PROGRAM PRODUCT FOR MANAGING ACCESS TO AND NAVIGATION THROUGH LARGE-SCALE INFORMATION SPACES

BACKGROUND OF THE INVENTION

1. Field of the Invention

The present invention is directed to systems, methods, and computer program products for managing and navigating large-scale information spaces, and more particularly, systems, methods, and computer program products for managing and navigating digital libraries.

2. Discussion of the Background

The "Principle of Least Effort" stands for the notion that when a user is confronted with an information system, the tendency is for the user to be satisfied with the information that can be easily found, as opposed to better information that would require more effort on the user's part to locate. The concept of the Principle of Least Effort is discussed at length in Chapter 8 of Mann, "Library Research Models: A Guide to Classification, Cataloging, and Computers," Oxford University Press, 1993, the entire contents of which are incorporated herein by reference. It is a primary objective of library professionals to design systems that can provide users with the highest quality information available and in a minimum amount of time and/or effort.

With the popularization of the Internet, the amount of information that has become available has become so large that it is not practical for users to search and assess the quality of all the information that is now available to them. While more information typically is beneficial, many professions have become hamstrung by an overabundance of information of variable quality readily available to them. One such example is the healthcare industry. Health insurance organizations, such as health maintenance organizations (HMOs) and planned provider organizations (PPOs) have placed restrictions on doctors that severely limits the amount of time that a doctor can spend on any given patient. One problem that this has presented to physicians is that the amount of time that they can spend researching a patient's condition has been severely limited.

The Internet has provided healthcare professionals a mechanism through which the most recent medical and research information can be accessed. However, given the amount of information that is available, and the severe limits on the physician's time available for research, it is impossible for the doctors to spend the time required to assess the quality of the information available to them. Therefore, it is not uncommon for doctors to rely on a limited, albeit trusted, set of information. One impact of this problem is that doctors are not being kept current on new developments in the medical field. Another impact of this problem is that patients may not be receiving the best care available since their physicians may not be aware of the most recent developments relating to a patient's condition.

In an effort to address these problems in the medical field, organizations have begun to develop large repositories of medical information that can be distributed to physicians. These organizations can then provide a service of sorting through new information as it becomes available, assess the quality of the information, and providing what they believe to be the best information available to their clients. This model for addressing the problem can provide a large number of physicians with access to a common repository of quality information. This approach is a step in the right direction, but it is not without its problems. For example, it is to be expected that different physicians and different clinics will want access to different information. Physicians and clinics oftentimes provide specialized services, and accordingly, demand different levels of information for different specialties. Furthermore, aside from the medical specialities, it is not uncommon for physicians in different locations to want different levels of information for different medical conditions. For example, clinics located in urban areas are likely to see patients that have different conditions than those patients seen at a rural clinic.

Accordingly, it can be seen that conventional methods for providing access to large-scale information spaces are inadequate. In many cases, there is simply too much information available for the users to make sense of. In other cases, while the amount of information is manageable, the users have sacrificed their ability to control the content of information that they have access to. It is not practical to provide an information space that provides all content for all potential users. It would be advantageous to users of information if an approach were developed that allowed localized managers, such as local librarians, to provide their users with access to the content that was of most interest to their particular user population. The library professionals would become managers of links to content, rather than managers of the content itself. Such an approach would empower the library and information system professionals to collaboratively develop links to the best information that best meets the needs of their particular user population.

The librarians, or other managers of information, would be able to focus on gaining and organizing access to the content their users desire, and not be concerned with the overwhelming task of developing a library of the content itself. It would be advantageous if the librarians, through collaboration, could focus on navigation and access to content of interest, rather than the daunting task of creating their own content collection. Advantages to users of information will be provided by helping them to quickly navigate to the highest quality information of most interest to them. Through collaboration, the managers of the information will be able to tailor the navigation to their particular users' needs. The need for navigation tools to leverage the amount of information available over the Internet, for example, was discussed in Wurster, T., "Getting Real About Virtual Commerce," Harvard Business Review, President and Fellows of Harvard College, November 1999/December 1999, the entire contents of which is incorporated herein by reference.

As managers of large-scale information spaces, librarians would benefit from being able to track how their users are accessing the information. For example, it would be advantageous if a digital librarian could track the traversal path of users through a digital library so that those paths could be optimized based on historical usage patterns. It has been recognized that conventional server logs are very error prone, and therefore do not serve as a reliable source for such usage information. In particular, the inconsistent level of information maintained by conventional browsers and the caching levels of those browsers can lead to the creation of incomplete or inaccurate server logs. The difficulties presented in gathering reliable log information are discussed in detail in Fieber, J., "Browser Caching and Web Log Analysis," 1999 Mid-Year Meeting, American Society for Information Science, May 24–26, 1999, the entire contents of which is incorporated herein by reference. Therefore, conventional server logs have not provided a reliable source of usage information for librarians.

The challenge, then, as presently recognized, is to develop an approach and tools for library and information system professionals to provide navigation aids and access to a manageable amount of information that has been assessed for quality, and which is easily tailored to meet the needs of specialized groups of users. It would be advantageous if such a system were dynamic, meaning that the information available to the users of the system was constantly updated and arranged to facilitate navigation for the users of the information. It would be further advantageous if a feedback mechanism were provided that maintained accurate usage information on the users for the library professionals and other managers of information and enabled users to explicitly register their satisfaction with the real-world outcome of using the provided information (e.g., relevance rating, etc.).

SUMMARY OF THE INVENTION

The inventors of the present invention have recognized that currently no systems, methods, or computer program products are available to manage access to and navigation through large-scale information spaces in such a way that can meet the diverse, specialized needs of multiple sub-populations of users of the system. Accordingly, one object of the present invention is to provide tools for library and information system professionals or other managers of information that provide a solution to this problem, as well as other problems and deficiencies associated with managing and navigating large-scale information spaces.

The inventors of the present invention have also recognized that it would be advantageous to provide the ability to easily add resources to the information space, as well as to customize, for either individual users or groups of users with common interests, the view the user has into the information space. Accordingly, a further object of the present invention is to provide an interface that allows for resources that are not currently available in the information space to be easily catalogued and made available to the users of the system. It is another object of the present invention to provide a mechanism through which views of individual users or groups of users with common interests are tailored by adding resources of interest to them, and by allowing them to navigate through the information space without needing to traverse through information not of interest to them.

The present inventors have also recognized that it would be advantageous to track the navigational usage of their users, so that access and navigation patterns can be used to further tailor the presentation of the information space to the users. Accordingly, a further object of the present invention is to provide a reliable exactly-correct server log through which user patterns can be tracked for a variety of purposes.

The above described and other objects are addressed by the present invention which includes a novel computer-based system, method, and computer program product that manages and provides for easy navigation of large-scale information spaces.

In one embodiment, the present invention is implemented as an Internet-enabled clinical digital library. A server database includes an ontology of medical information that is constantly updated and added to, according to the needs of the users of managed digital libraries. The server database includes link information that is presented to the users of the digital library providing an access method (e.g., a deep-link) directly to the content of interest. The database also includes information describing the various views that have been customized for users and groups of users into the holdings of the library. The system also maintains an exactly-correct server log that tracks the use of the digital library by each of the users.

It is another object of the present invention to provide a software application program interface (API) to the capabilities of the present invention. By providing an API, the capabilities of the present invention may be readily incorporated into custom software applications directed to a variety of problems in which large-scale information access and/or navigation is a concern.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

Figure 1:
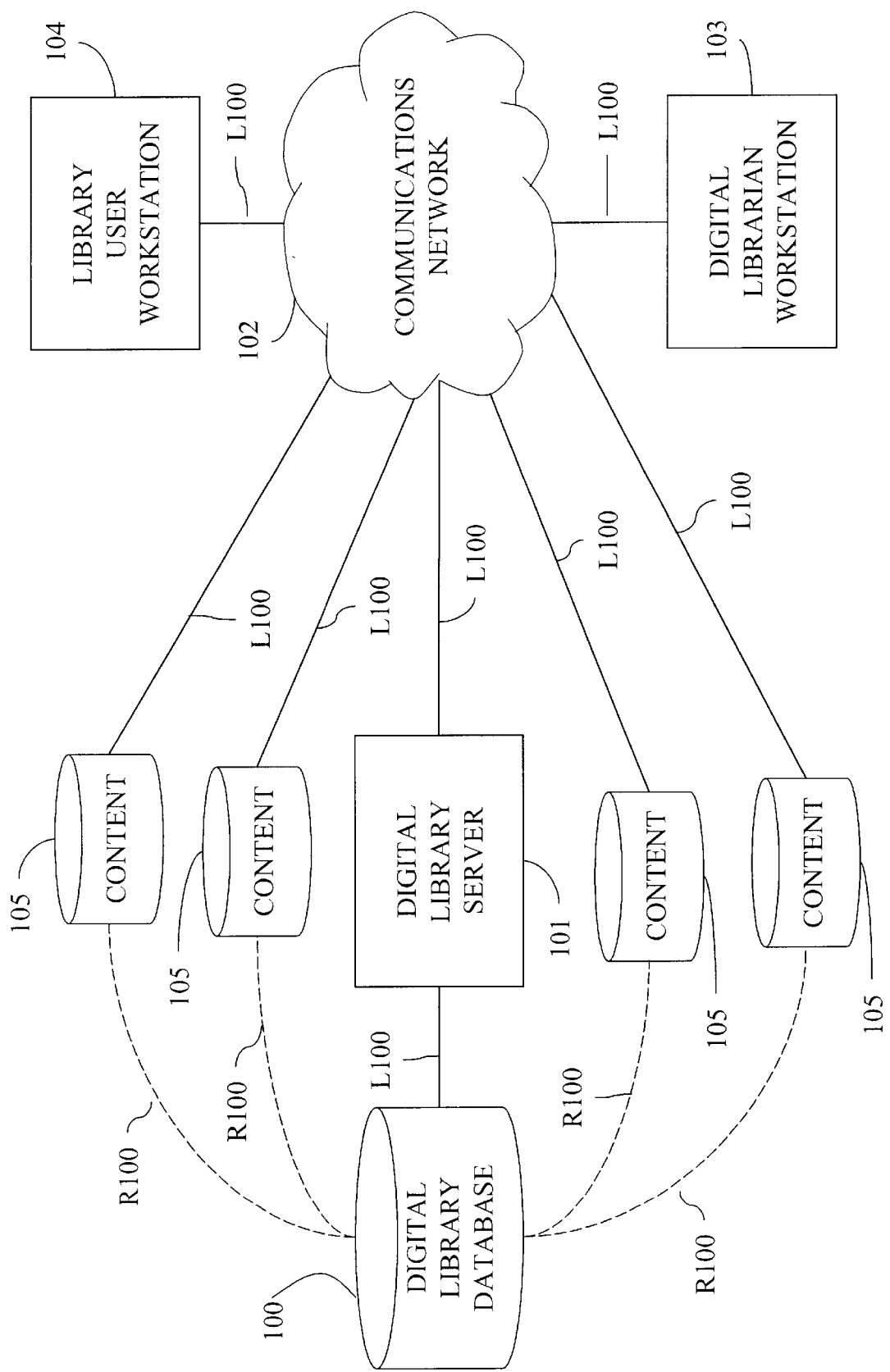
FIG. 1 is a block diagram showing an overall system configuration for one embodiment of the present invention.

Referring now to the figures, wherein like reference numerals designate identical or corresponding parts throughout the several views, and more particularly to FIG. 1 thereof, which is a block diagram of a system for managing access to and navigation through a large-scale information space. The present embodiment is discussed in the context of clinical digital libraries. However, the invention may be used in other contexts, for example, providing access to any large-scale information space where the managers and/or users of that information desire the ability to customize various views into the library. One such example would be in the legal profession, where practitioners have specialized interests and require access to large amounts of information from a variety of sources. The present invention would be applicable to any organization or profession that is confronted with the problems of access to large amounts of information.

FIG. 1 shows that the system includes a digital library database 100, a digital library server 101, a communications network 102, such as the Internet, a digital librarian workstation 103, a library user workstation 104, and many different repositories of content 105. The various components of this system are linked together via a network link L100. The links between the digital library database 100 and the various repositories of content 105 are by references R100 contained in the digital library database 100 indicating the location of the content, in one embodiment, the digital library database 100 is a link base of references. These references are hyperlinks that provide deep links directly to the specific location of the content 105 of interest.

Figure 10:
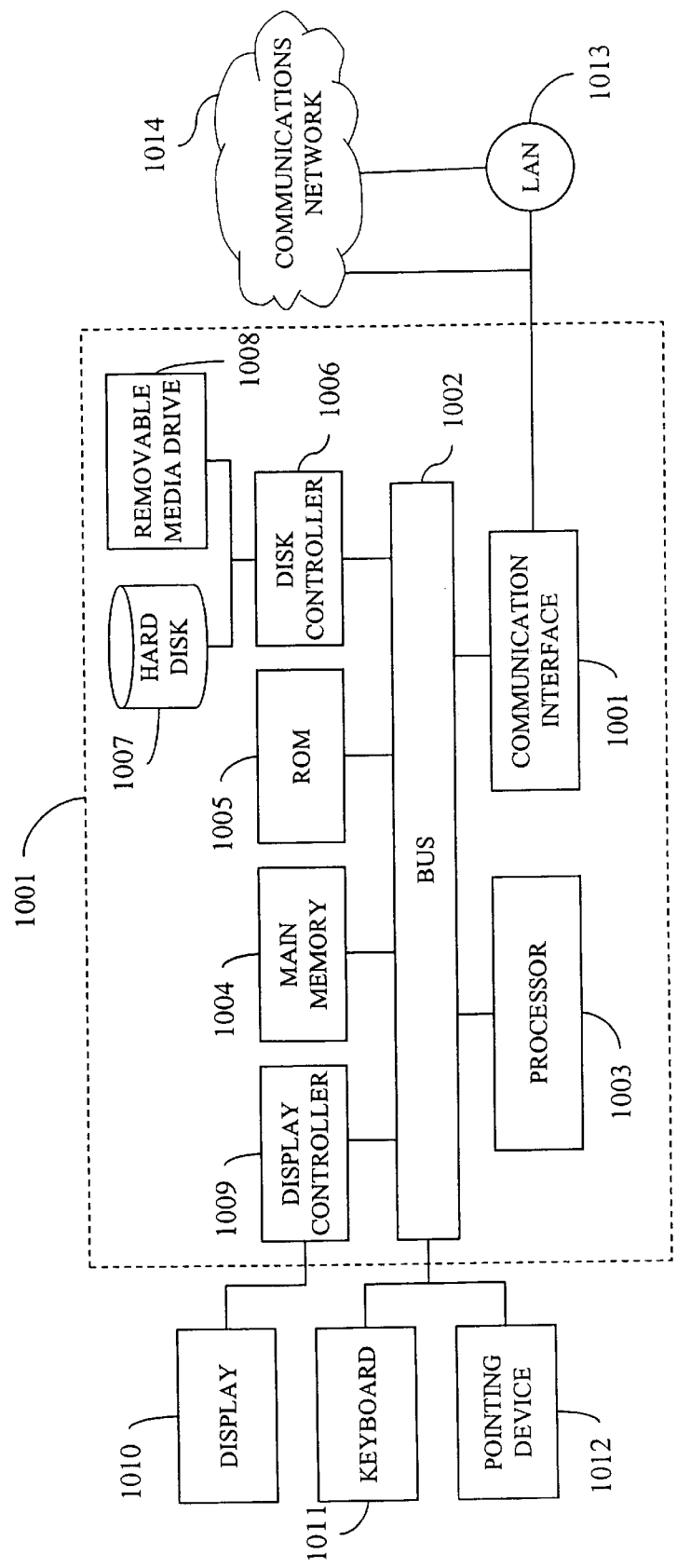
FIG. 10 is an exemplary computer system programmed to perform one or more of the special purpose functions of the present invention.

The digital library server 101 is implemented using the computer system 1001 of FIG. 10, for example, but also may be any other suitable personal computer (PC), workstation, server, or device for communicating with the digital librarian workstation 103 and the library user workstation 104, and for storing and retrieving information in the digital library database 100.

The digital library database 100 is a digital repository that may be implemented, for example, through a commercially available relational database management system (RDBMS) based on the structured query language (SQL) such as, for example, ORACLE™ SYBASE™, INFORMIX™, DB/2 or MICROSOFT™ SQL SERVER™, through an object-oriented database management system (ODBMS), or through custom database management software. In one embodiment, the digital library database contains an ontology of the information contained in the digital library. For example, the digital library database may include a hierarchical organization of clinical information that had been specifically created for a physician seeing patients in a clinical setting (e.g., by an information professional or the physician him/herself). The digital library database 100 includes not only the hierarchical ontology of the information, but also access methods (e.g., hyperlinks) that provide direct links (e.g., deep links) to content 105 pertaining to each particular ontological category. Access methods include, but are not limited to hyperlinks to content 105 of interest. Data in the digital library database 100 is maintained by processes running on the digital library server 101. The digital library database 100 may reside on a storage device of the digital library server 101, or reside on another device connected to the digital library server 101, for example, by way of a local area network, or other communications link such as a virtual private network, wireless link, or Internet-enabled link.

The digital library server 101 receives requests from, and provides information to, the digital librarian workstation 103 and the library user workstation 104, by way of a connection to a communications network 102. In one embodiment, the communications network 102 is the Internet. The digital librarian workstation 103 may be implemented using the computer system 1001 of FIG. 10, for example, or any other suitable PC, workstation, server, or device for communicating with the digital library server 101, and accessing content 105 through a communications network 102. The digital librarian workstation 103 is used by librarians to maintain and customize the ontological hierarchy maintained in the digital library database 100, to create customized views into the digital library database 100 to facilitate navigation through the information for users with specialized interests, and to add or remove access (e.g., hyperlinks) to content 105 from the digital library database 100.

The library user workstation 104 may be implemented using the computer system 1001 of FIG. 10, for example, or any other suitable PC, workstation, server, or device for communicating with the digital library server 101 and accessing content 105 through a communications network 102. The library user workstation 104 provides users of the digital library with a mechanism for accessing the information maintained in the digital library database 100 as links to content 105.

Figure 2:
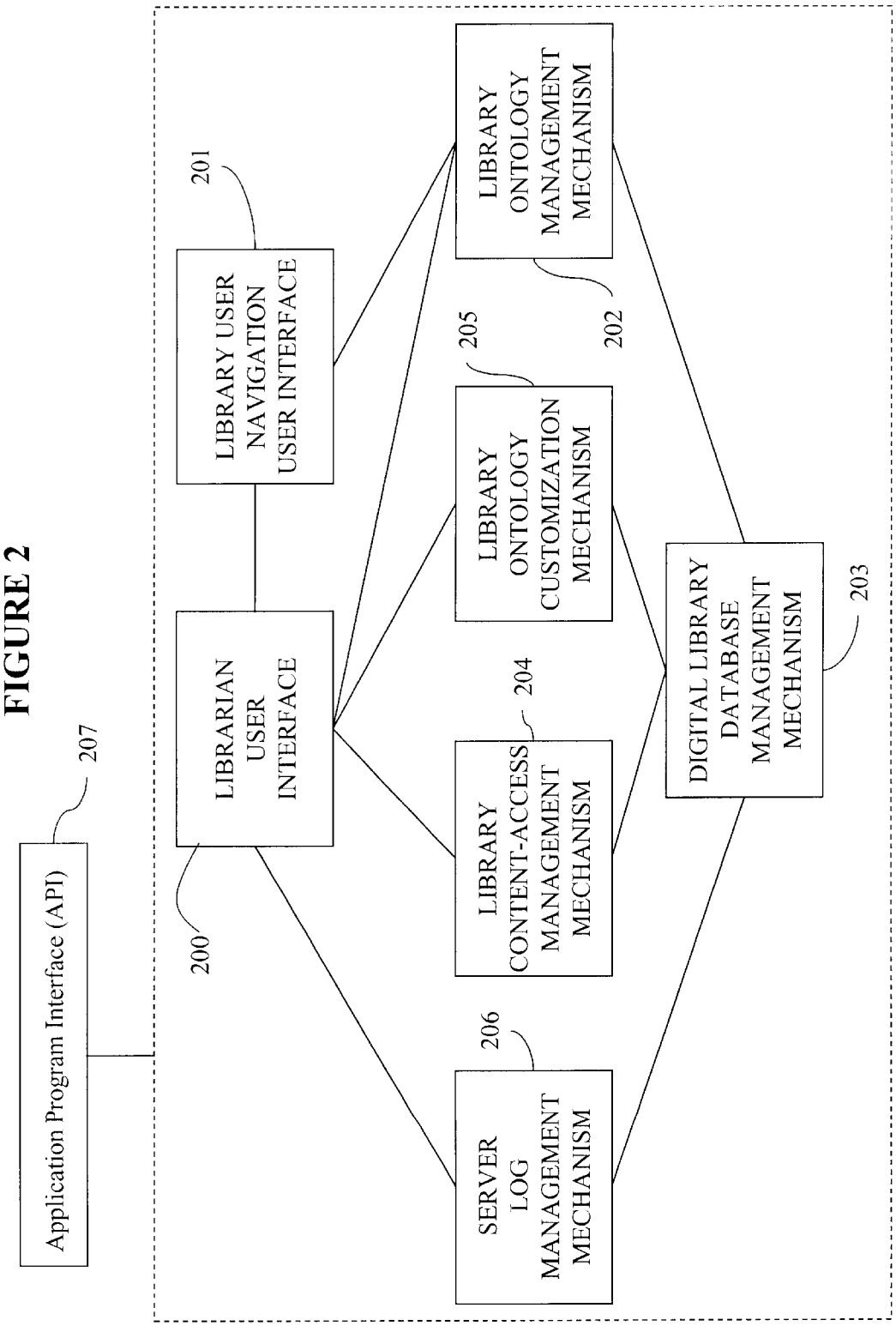
FIG. 2 is a block diagram showing mechanisms of a digital librarian workstation, a library user workstation and a digital library server shown in FIG. 1.

FIG. 2 shows the mechanisms implemented by the digital library server 101, the digital librarian workstation 103, and the library user workstation 104 in greater detail. The librarian user interface 200 provides a mechanism through which librarians can manage which content 105 is available through the digital library, as well as a mechanism through which the ontology held in the digital library database 100 may be maintained. In one embodiment, the librarian user interface 200 is implemented through displayable pages accessible through the digital library server 101 using a commercially available web browser tool including, but not limited to INTERNET EXPLORER™, available from MICROSOFT CORPORATION™, and NETSCAPE NAVIGATOR™, available from NETSCAPE COMMUNICATIONS CORPORATION™.

Processes on the digital library server 101 build the pages (e.g., hypertext markup language (HTML) pages, extensible HTML (XHTML), or dynamic HTML (DHTML) pages) which serve as the librarian user interface 200 and the library user navigation user interface 201. In one embodiment, the processes running on the digital library server 101 responsible for interacting with the digital librarian workstation 103 and the library user workstation 104 are developed using software development environment such as WEBSPHERE™, VISUALAGE FOR JAVA™, both available from IBM, and JavaScript.

HTML, XHTML, and DHTML are standard markup languages as would be well understood by one of ordinary skill in the software art. XHTML is a version of HTML written in extensible markup language (XML), which is another standard markup language as would be well understood by one of ordinary skill in the software art. HTML and XHTML are described in Musciano et al., "HTML & XHTML: The Definitive Guide," O'Reilly & Associates, $4^{th}$ Edition, August 2000, the entire contents of which are incorporated herein by reference. DHTML is described in Goodman, D., "Dynamic HTML: The Definitive Reference," O'Reilly & Associates, $1^{st}$ Edition, July 1998, the entire contents of which are incorporated herein by reference. XML is described in Marchal, B., "XML By Example," Que, December 1999, and Harold, E., "XML Bible," IDG Books Worldwide, Book and CD ROM Edition, July 1999, the entire contents of both of which are incorporated herein by reference. WEBSPHERE™ and VISUALAGE™ programming are described in Ben-Natan et al., "IBM WebSphere Starter Kit," Osborne McGraw Hill, Book and CD ROM Edition, May 16, 2000, and IBM International Technical Support Organization (IBM Redbooks), "IBM WebSphere and VisualAge for Java Database Integration with DB2, Oracle, and SQL Server," IBM Corporation, September 1999, the entire contents of both of which are incorporated herein by reference. JavaScript is described in Flanagan, D., "JavaScript: The Definitive Guide," O'Reilly & Associates, $3^{rd}$ Edition, June 1998, the entire contents of which are incorporated herein by reference.

The library user navigation user interface 201, like the librarian user interface 200, is the mechanism through which end users of the digital library interact with the digital library database 100 in order to navigate to and access content 105 available through the digital library. The library user navigation user interface 201 includes a mechanism through which users of the digital library with special privileges may access some of the capabilities that would otherwise only be accessible through the librarian user interface 200. For example, some users may be given the ability to add access to, for example, a hyperlink to new content 105, to the holdings of the digital library database 100. As with the librarian user interface 200, the library user navigation user interface 201 may be implemented as browsable pages built by processes running on the digital library server 101, and sent through the communications network 102 to the library user workstation 104.

The library ontology management mechanism 202 interacts with the digital library database 100 to present the appropriate information to the users of the digital library. For example, in response to a selection of a high-level topic by a user, the library ontology management mechanism 202 will query the digital library database 100 through the digital library database management mechanism 203 and create a page that presents to the user the subordinate topics available for that selected topic, as identified by the ontology maintained in the digital library database 100. As the user selects more detailed topics, the library ontology management mechanism 202 will return access methods (e.g., hyperlinks) to content 105 corresponding to those topics of interest. As a user selects a hyperlink presented on the library user navigation user interface with, for example, a mouse "click," the user will link directly to the content 105 corresponding to that hyperlink through a communications network 102, for example, the Internet. By maintaining access methods to content 105, rather than the content 105 itself, the digital library holds deep links that link directly to the information of interest, thereby facilitating the users' navigation. Linking to content 105 over the Internet via a hyperlink embedded in a browsable page is a common user interface approach as would be well understood by one of ordinary skill in the software art, and the concepts are described in Gralla, P., "How the Internet Works," Que, Millenium Edition, August 1999, the entire contents of which are incorporated herein by reference.

The digital library database management mechanism 203 generates queries based on inputs through the librarian user interface 200 or the library user navigation user interface 201. Those queries are issued to the digital library database 100 under the digital library database management mechanism 203 which also receives the results of the queries. The results of the queries, for example, a list of ontological sub-topics for a selected topic are then presented to the user through either the librarian user interface 200 or the library user navigation user interface 201, as appropriate.

The library content-access management mechanism 204 maintains the links providing access to the content 105 associated with the ontological hierarchy in the digital library database 100. Through the library content-access management mechanism 204, the librarian user interface 200 can be used to add or remove hyperlinks to content 105. Also, the library content-access management mechanism 204 creates the various specialized views that facilitate navigation within the digital library. A specialized view allows a user to be presented only with that information that is of most interest to him or her. For example, while the ontology may represent a variety of medical specialties at great detail, a particular user (e.g., an allergist), may only want to see a subset of this information when they access the digital library. While the capability to create a specialized view and add access to content 105 is usually reserved for librarian or manager users, certain other users may be given the ability to manipulate their view and/or content by being given access to the content-access management mechanism 204.

The library ontology customization mechanism 205 is used by librarians through the librarian user interface 200 to adjust the ontological hierarchy maintained in the digital library database 100. Both the library content-access management mechanism 204 and the library ontology customization mechanism 205 interact with the digital library database 100 through the digital library database management mechanism 203.

The server log management mechanism 206 tracks the navigation of the digital library by the users and maintains a log of this information in, for example, the digital library database 100. The server log management mechanism 206 generates an exactly-correct server log by capturing each user's interaction with the digital library database 100 through the digital library database management mechanism 203. The availability of an exactly correct server log will facilitate the librarian's duties by providing insight as to which paths through the ontology are most commonly taken by users navigating the digital library. Conventional server logs have proven to be too error prone, and therefore can not be relied on. With this information, librarians or managers are able to customize the ontology through the library ontology customization mechanism 205 as accessed through the librarian user interface 200 accordingly.

As discussed above, in one embodiment, all of the mechanisms shown in FIG. 2 may be implemented using a software development environment such as WEBSPHERE™ and VISUALAGE™ available from IBM™. Processes running on the digital library server 101 can respond to requests received through a communications network 102, such as the Internet, from users using a library user workstation 104 or librarians using a digital librarian workstation 103. Those processes running on the digital library server 101 may respond to requests by creating the appropriate SQL query, issuing the query to the digital library database 100, receiving results from those queries, then creating an appropriate page that can be displayed by the librarian user interface 200 or the library user navigation user interface 201 that is responsive to the request. When the pages sent to the digital librarian workstation 103 or the library user workstation 104 include hyperlinks to content 105, the users of the system can simply select that hyperlink through the librarian user interface 200 or the library user navigation user interface 201 using an appropriate selection mechanism such as a mouse or other pointing device, and directly link to the content 105 of interest through a communications network 102, such as the Internet. Accordingly, it can be seen that the digital library database 100 need not store the content 105 itself, but rather, manage the presentation of the ontological hierarchy to the users, and provide hyperlinks to the content 105 of interest.

A role of library professionals, then, includes finding content 105 that best meets the needs of the users. A librarian can then provide access to the content 105 by adding an access method (e.g., a hyperlink) to the digital library database 100 through the library content-access management mechanism 204. Furthermore, the librarian can analyze the exactly-correct server log generated by the server log management mechanism 206 to gain insight into their users' navigation patterns. As discussed in the BACKGROUND OF THE INVENTION section, users tend to rely on information most easily found, rather than better information that is more difficult to find. Through the library content-access management mechanism 204 and the library ontology customization mechanism 205, as accessed through the librarian user interface 200, librarians can be constantly finding better content 105 for their users, and moreover, can be arranging access to that content 105 such that the best content 105 is the most easily available. The present inventors have recognized that the Principle of Least Effort, as discussed in the BACKGROUND OF THE INVENTION section, can be leveraged by continuously refining the organization and presentation of information that is most valued by users. The present invention provides an approach for information professionals to be responsive to users, thereby better-serving the users by leveraging their known idiosyncratic behavior.

In one embodiment, the functionality provided through the mechanisms shown in FIG. 2 is accessible through a software application program interface (API) 207 so that other software applications can easily incorporate it. The API 207 includes function calls that when invoked by a calling software application allow that application to, for example, communicate with a digital library server 101 and/or access information being maintained in a digital library database 100. As another example, the API 207 provides the calling software application with access to the exactly-correct server log information. As would be well understood by one of ordinary skill in the software art, an API 207 to the functionality of the present invention provides a mechanism through which navigation tools for large-scale information spaces may be integrated into any software application.

Figure 3:
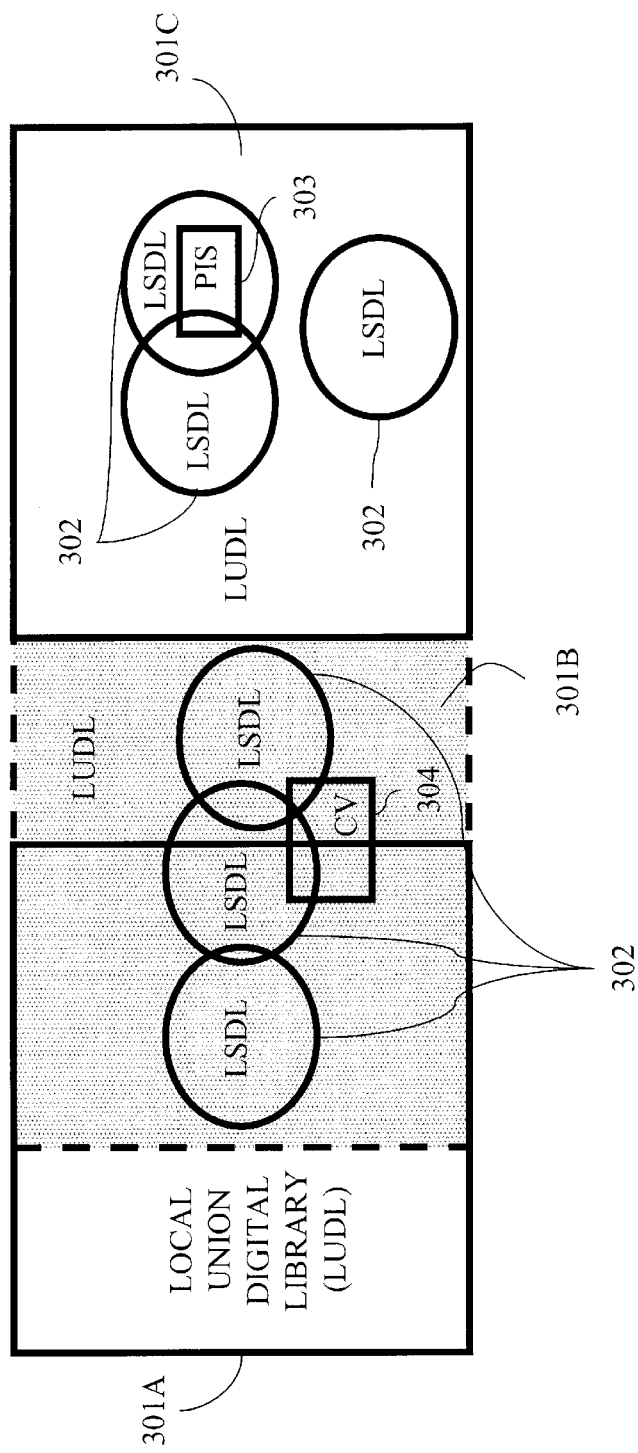
FIG. 3 is a block diagram showing the interrelationship between the global union digital library, local union digital libraries, local specialized digital libraries, personal information spaces, and collegial views in one embodiment of the present invention.

FIG. 3 is a block diagram showing the interrelationships between various views of the information maintained in the digital library database 100 using an exemplary specialization scheme. As would be well understood by one of ordinary skill in the library science art, a variety of specialization schemes could be devised.

In one embodiment, the global union digital library (GUDL) 300 represents a virtual universe of all of the content 105 that could be potentially accessed through an access method stored within the digital library database 100. It should be noted that more than one digital library may reside within a particular digital library database 100. Within the digital library database 100, various local union digital libraries (LUDLs) 301A, 301B, 301C may be created which will provide a common view to certain users that have interests in a common subset of the GUDL 300 holdings. Referring to the example illustrated in FIG. 3, three different LUDLs 301A, 301B, 301C, which may or may not overlap with one another may exist, all containing access to content 105 that is accessible within the virtual GUDL 300. In FIG. 3, the first LUDL 301A overlaps with the second LUDL 301B (illustrated in FIG. 3 with a dotted line border and shading), whereas the third LUDL 301C does not overlap with any other LUDLs. In other embodiments, the GUDL 300 may have boundaries that are established by the library professional or other manager of the information.

Within a LUDL 301A, 301B, 301C, one or more local specialized digital libraries (LSDLs) 302 can be created to provide a view into a more specialized area of the LUDL 301A, 301B, 301C. As shown in FIG. 3, the LSDLs 302 may or may not overlap one another.

As shown in FIG. 3, all LUDLs 301A, 301B, 301C, are within the GUDL 300. Also, all LSDLs 302 are contained within a LUDL 301A, 301B, 301C.

As discussed above, a specialized view into the GUDL 300 may be created for those users that have specialized needs. As shown in FIG. 3, a personal information space (PIS) 303 or a collegial view (CV) 304 may be created for these types of users. In this exemplary scheme, those users that have access to a PIS 303 or a CV 304 are given access to functionality implemented by the library content-access management mechanism 204 to control which content 105 is accessible through their view. Accordingly, those users with a PIS 303 or CV 304 may add links to content 105 to the digital library database 100 that will be included in their view that is not necessarily included in the LUDL 301A, 301B, 301C that they originally had as a view. Through such a process, these special users, or alternatively, the library professionals or other information managers, may enrich the LUDLs 301A, 301B, 301C by managing the navigation through, or adding access to new content 105 to the LUDLs 301A, 301B, 301C.

By having the ability to create specialized views into the GUDL 300, librarians are able to focus their users on the content 105 that is of the most interest to them. While all information in the GUDL 300 is potentially available to all users, only that content 105 that is of the most interest to a particular group of users is presented to them as their primary view. Moreover, librarians, through access to the exactly-correct server log information or through user input, collaborate with one another to ease the navigation through the digital library for their particular user populations.

Figure 4:
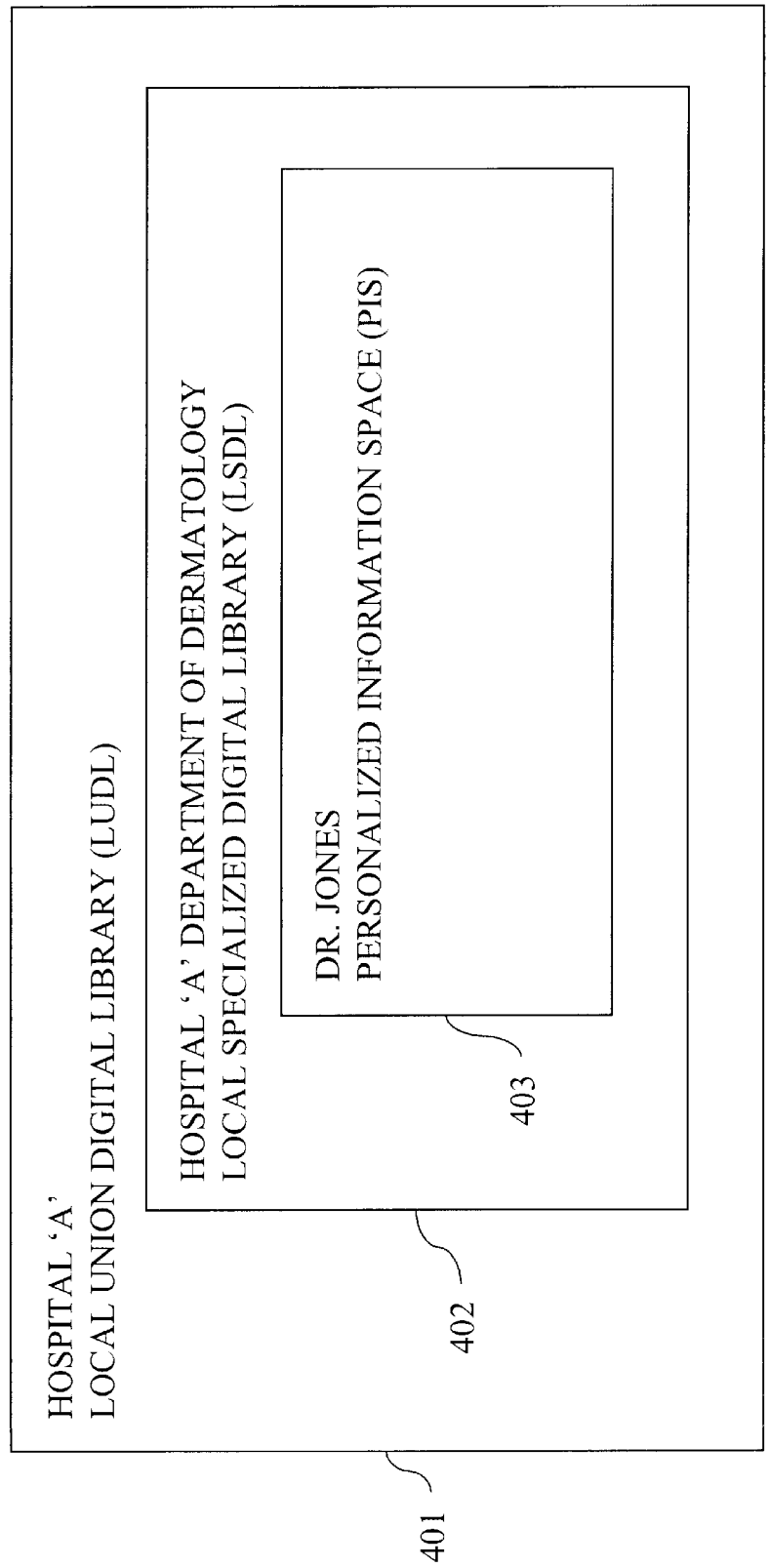
FIG. 4 shows an exemplary hierarchical representation of the specialization of a local union digital library in one embodiment of the present invention.

FIG. 4 shows an example of how views into a virtual GUDL 300 may be specialized to accommodate the interests of different groups of users. As shown in FIG. 4, within a virtual GUDL 300, a particular hospital may be interested in only a subset of the information available in the GUDL 300. As such, a librarian representing that hospital may create a LUDL 301A, 301B, 301C to include that subset of information of particular interest to that hospital. It should be noted that all information available in the GUDL 300 would remain available to the hospital that has established a LUDL 301A, 301B, 301C, however, those users belonging to the hospital will be presented with a specialized interface into the GUDL 300 that more readily facilitates access to that information within the LUDL 301A, 301B, 301C. An example of why a hospital may create a LUDL 301A, 301B, 301C would be where that particular hospital does not practice a particular specialty for which information is available in the GUDL 300. Accordingly, the librarian for the hospital would create a LUDL 301A, 301B, 301C that privileges that information of most interest to that library's users. As such, the librarian would not privilege information pertaining to specialties that are not of preeminent interest at that particular hospital. The concept of privileging information is understood by those of ordinary skill in the library art, and is discussed in Buckland, M., "What Will Collection Developers Do?," Information Technology and Libraries, September 1995, the entire contents of which are incorporated herein by reference.

Continuing with FIG. 4, the librarian for a particular department within the hospital may wish to further specialize the view into the GUDL 300 beyond the specialization created by the LUDL 301A, 301B, 301C. For example, a dermatology department may wish to create an LSDL 302 that includes only dermatological information, thereby providing an even more focused view for that librarian's customers. Furthermore, using this specialization technique, a particular doctor may wish to have his own PIS 303 created within the LSDL 302 that was created for the Department of Dermatology. The PIS 303 view into the LSDL 302 may be created, for example, to support a special research project. In doing so, the librarian may wish to provide the individual with specialized access, that will enable them to find their own content 105 to include into their PIS 303 view. Similar to a PIS 303 would be a collegial view (CV) 304. A CV 304 is merely a PIS 303 for a group of individuals with like interests.

In working closely with the users of the digital library, librarians can further customize either the views or the content 105 to address the needs of their users. Moreover, local librarians can use the present invention to collaborate with one another or with a centralized librarian in order to provide their user populations with the most effective navigation and most useful information available. By constantly refining which content 105 is accessible through the digital library, and how the users navigate through that content 105, the users of the digital library are avoiding the pitfalls of the Principle of Least Effort, discussed in the BACKGROUND OF THE INVENTION section, by constantly gaining easier access to better content 105. Not only can the users work explicitly with the librarian to achieve these goals, but through the exactly-correct server log, the librarians can make their own assessment as to the best organization of the content 105 for their particular user population.

Furthermore, as discussed in the BACKGROUND OF THE INVENTION section, by having local librarians refine the navigation through and access to the content 105, the digital library becomes fine-tuned to a particular user population. The present invention provides tools for library and information system professionals to maximize their users leverage of information. Since the views into the GUDL 300 are optimized for local use, different users will be presented with different results to a common search of the digital library. By tapping into the experience and feedback mechanism provided by library professionals, the users are will increasingly benefit from their use of the digital library. Library professionals can share information that will allow them to learn from the successes and failures of other professionals in customizing the navigation and content 105 accessible through the views into the GUDL 300 under their responsibility.

Figure 5:
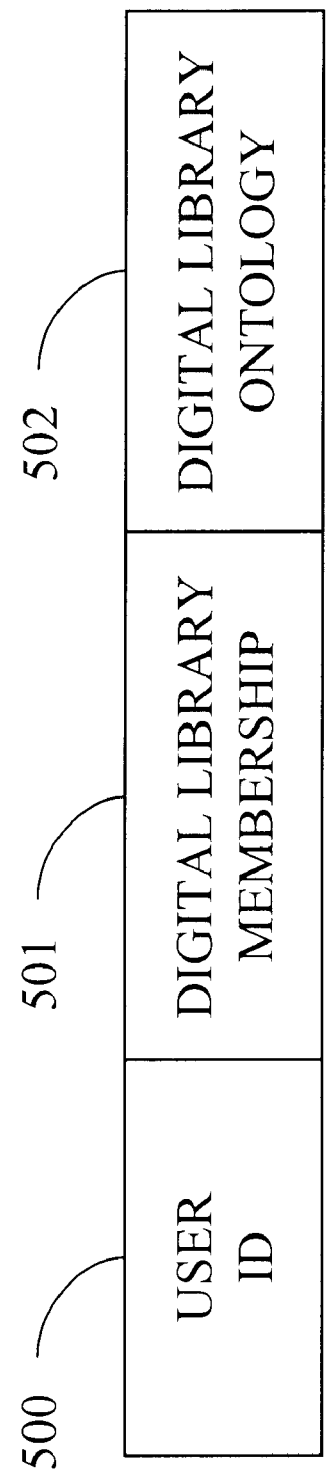
FIG. 5 is an exemplary data field structure showing a digital library membership record for a particular user.

FIG. 5 shows a structure of one example of a record whereby the digital library server 101 can determine which view of the GUDL 300 to present through a librarian user interface 200 or a library user navigation user interface 200 for a particular user. As shown in FIG. 5, the message includes a user ID field 500 by which the user is identified. The digital library membership field 501 identifies which LUDL 301A, 301B, 301C should be presented to the user. The digital library ontology field 502 identifies which view (i.e., LUDL 301A, 301B, 301C, LSDL 302, PIS 303, or CV 304) into the LUDL 301A, 301B, 301C corresponds to the user identified in the user ID 500. As described above, the views are a customized or filtered presentation of the ontology maintained in the digital library database 100 according to a user's or a group of user's preferences and/or access privileges. By storing the view of the GUDL 300 with the user ID 500, the digital library server 101 may efficiently manage a system containing large numbers of users and specialized views. The content 105 accessible by the digital library is then navigable through the various views into the LUDL 301A, 301B, 301C.

Figure 6:
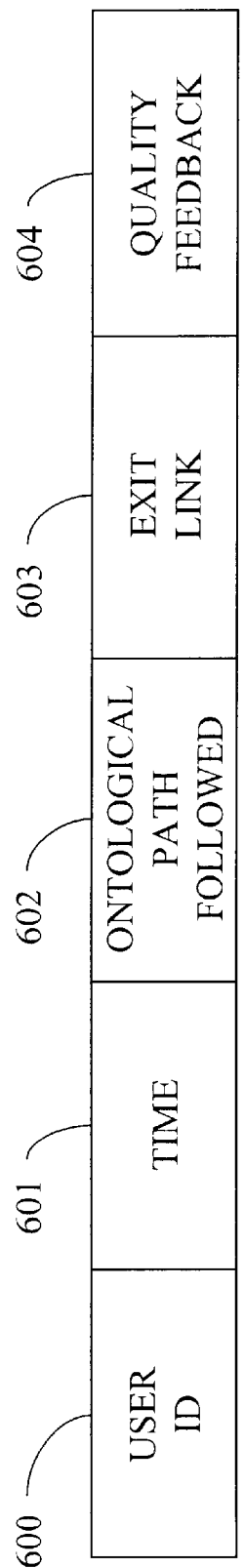
FIG. 6 is an exemplary data field structure showing an exactly-correct server log record.

FIG. 6 shows a structure of one example of a record containing log entries tracking the traversal through a digital library by a particular user. As shown in FIG. 6, the record provides data including a user ID field 600 identifying the user, a time field 601, identifying the time that user visited a particular location within the library, an ontological path followed field 602 identifying the exact hyperlink from the link base followed, an exit link field 603, identifying the exit point hyperlink from the link base followed by the user when linking to content external to the digital library, and a quality feedback field 604, for capturing qualitative feedback from the user as to the usefulness of the information contained at the location exited to. As would be understood by one of ordinary skill in the library art, the information captured by the exit link field 603 is analogous to recording which book was checked out by a user of a brick-and-mortar library. By maintaining a record for each location followed by each user, an exactly-correct server log may be maintained in the digital library database 100. As discussed above, such a log provides valuable insight for a librarian as to how the information maintained in the digital library is navigated by the users and can provide a variety of informational purposes. Furthermore, the present invention facilitates an iterative improvement process by providing a mechanism (e.g., the quality feedback field 604) through which qualitative feedback can be provided by the users to the library professionals. Librarians and other managers of the digital library will be empowered by having both quantitative (e.g., an accurate log of usage information) and qualitative (e.g., quality feedback information) feedback as to the usage patterns and satisfaction of the users of the library. With this information, library professionals may adjust the presentation of the information by refining the ontology and privileging the most-favored content to cater to the library users' usage and feedback.

Figure 7:
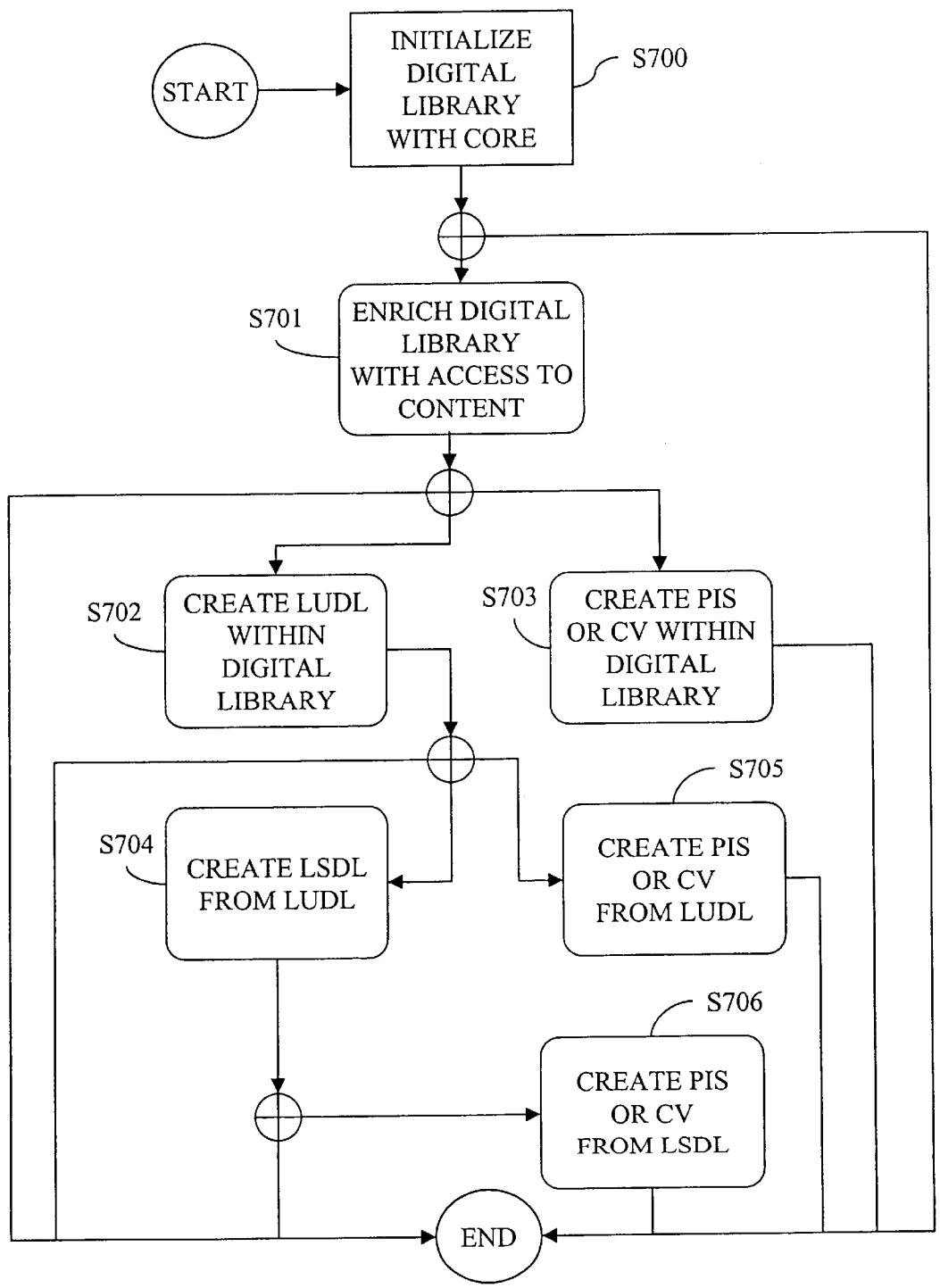
FIG. 7 is a flow diagram of a process to specialize the views into a global union digital library in one embodiment of the present invention.

FIG. 7 shows a process through which specialized views into a global union digital library 300 can be created by a librarian. As shown in FIG. 7, the process begins with step S700 where the digital digital library is initialized with a core. A core defines an ontology and is provided with links to the initial content 105 holdings of the digital library, and will therefore typically be targeted to a broad population of users. After the digital library has been initialized with the core at step S700, the process can either end or proceed to step S701 where the core content 105 of the digital library is enriched with links to further content 105. If the process ends after step S700, all users of the digital library will have the same view into the digital library which will contain access to only the core content 105. At step S701 it is possible for a librarian to not only specialize the ontology by effecting changes for a particular user or group of users, but also to enrich the core content 105 by adding access to content 105 that is of particular interest to that librarians's user population.

After the digital library has been enriched with access to further content 105 at step S701, the process can end, the librarian can create a local union digital library 301A, 301B, 301C within the digital library at step S702, or the librarian may create a personal information space 303 or a collegial view 304 within the digital library at step S703. If the librarian creates a LUDL 301A, 301B, 301C within the digital library at step S702, the librarian will arrange those portions of the ontology that are of particular interest to that librarian's user population into a new view that will be presented via the library user navigation user interface 200 to that user population. Creating a LUDL 301A, 301B, 301C does not remove access to any content 105 from the digital library system, it merely facilitates navigation to the information of most interest to a particular user population as the primary content 105. Similarly, if a PIS 303 or CV 304 is created within the digital library at step S703, the result is a specialized view facilitating navigation through the content 105 accessible through the digital library for a single individual (PIS 303) or a small group of individuals (CV 304) with common interests. In one embodiment, when a PIS 303 or a CV 304 is created, those specialized users are given access to functionality normally reserved for librarians through the librarian user interface 200, so that those users may add access to content 105 to the digital library that meets their specialized needs. After a PIS 303 or CV 304 has been created within the digital library at step S703, the process ends.

After a LUDL 301A, 301B, 301C has been created at step S702, the process may end, the librarian may create a local specialized digital library 302 within the LUDL 301A, 301B, 301C at step S704, or a librarian may create a PIS 303 or CV 304 within the LUDL 301A, 301B, 301C at step S705. If the librarian creates a PIS 303 or CV 304, the process is the same as that described above in regard to step S703, except that the librarian may create the PIS 303 or CV 304 within the LUDL 301A, 301B, 301C created at step S702.

At step S704, the librarian creates a LSDL 302 within the LUDL 301A, 301B, 301C created at step S702. While a LUDL 301A, 301B, 301C may be specialized with regard to the organization's interest, the LSDL 302 may correspond to the information of interest to a department within that organization, for example. With each level of specialization, the librarian is providing a particular set of users with a more specialized and focused view into the information accessible through the digital library. Accordingly, each user can be more productive by having a specialized view into the digital library. Without this specialization, users would inevitably have to repeatedly navigate through information not of interest to them so as to access information that is of interest to them.

After the librarian has created a LSDL 302 at step S704, the process may end, or the librarian may create a PIS 303 or CV 304 from the LSDL 302 at step S706. As discussed above, in regard to steps S703 and step S705, the PIS 303 or CV 304 may be created to further specialize a view into the content 105 accessible through the digital library.

As would be appreciated by one of ordinary skill in the library art, this specialization process described in FIG. 7 is an iterative and ongoing process further refining the presentation of the ontology and further refining the navigation to the content 105 accessible through the digital library for the various user populations of the digital library. As users desire access to more content or more efficient navigation through the content already accessible, the users can make the appropriate requests of their librarian. In one embodiment, the library user navigation user interface 201 includes a mechanism through which users may communicate their requests directly to their librarian through, for example, an e-mail message.

Figure 8:
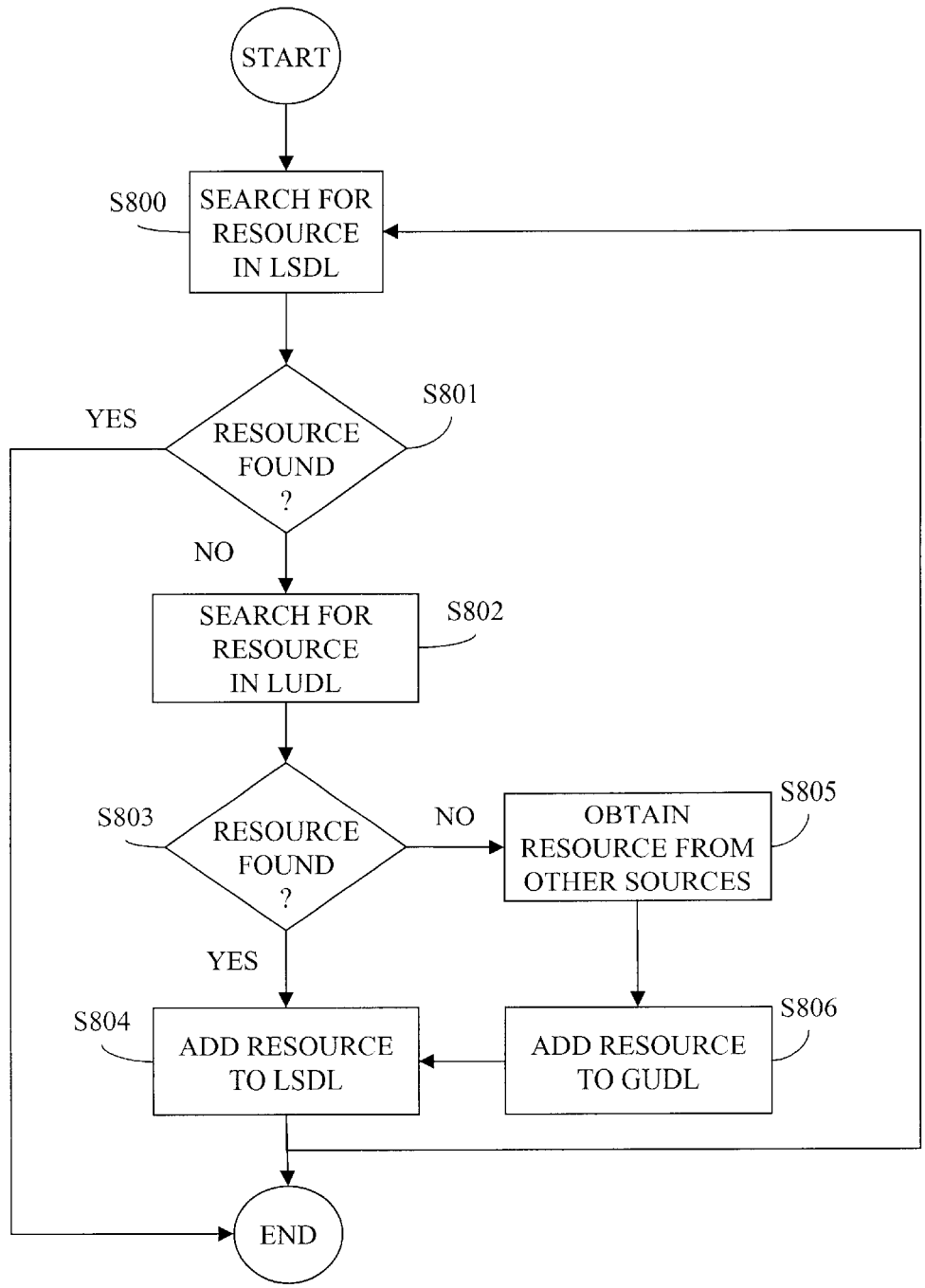
FIG. 8 is a flow diagram of a process to add an additional resource to a global union digital library in one embodiment of the present invention.

FIG. 8 shows a process through which access to an additional resource may be added to a local union digital library 301A, 301B, 301C. As shown in FIG. 8, the process begins with step S800 where a user searches for a resource within their local specialized digital library 302. Since the LSDL 302 is a specialized view into the LUDL 301A, 301B, 301C, a search for a resource within a LSDL 302 will also search within the LSDL's 302 LUDL 301A, 301B, 301C for that resource. At step S801, it is determined whether the resource being searched for can be located. If the resource can be found within the LSDL 302 or the LSDL's 302 LUDL 301A, 301B, 301C, the process ends. However, if the resource cannot be found within the LSDL 302 or the LSDL's 302 LUDL 301A, 301B, 301C, the resource is searched for within the global union digital library 300 at step S802. At step S803, it is determined whether the resource being searched for at step S802 can be found within the GUDL 300. If the resource being searched for is found within the GUDL 300, access to that resource (e.g., a hyperlink) is added to the LSDL 302 at step S804. Since the LSDL 302 is a subset of the LUDL 301A, 301B, 301C, by adding the access to the found resource to the LSDL 302, that access is also added to the LUDL 301A, 301B, 301C. However, if the resource being searched for cannot be found within the GUDL 300, the process proceeds to step S805 where that resource is obtained from other sources. After the resource is obtained from another source at step S805, the process proceeds to step S806 where that resource is added to the GUDL 300. Once the resource has been added to the GUDL 300 at step S806, the process proceeds to step S804 where access to that resource is added to the LSDL 302 that was originally searched. After access to the resource is added to the LSDL 302, the process may either return to step S800 where it may be verified that the new resource has been successfully added, or the process ends. As discussed above, adding access to a resource includes adding, for example, a hyperlink or deep link at the appropriate level within the ontological hierarchy that is maintained in the digital library database 100. Accordingly, it is not necessary to obtain the content 105 itself, but rather, an address, or hyperlink, directly related to that content 105.

Figure 9:
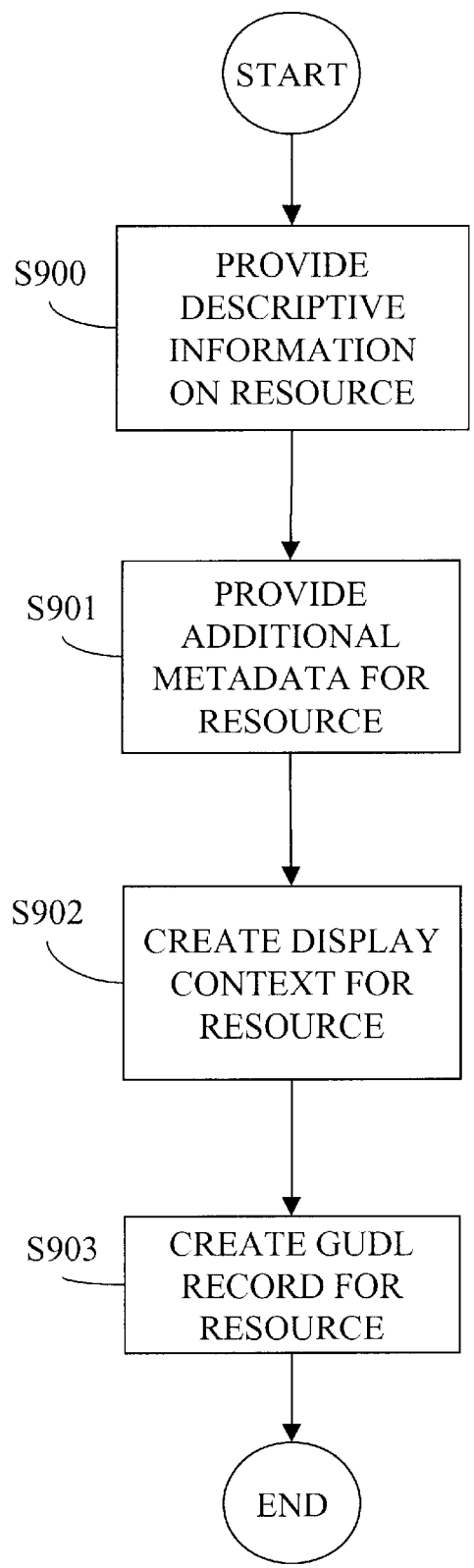
FIG. 9 is a flow diagram of a process to catalog a new resource to a global union digital library in one embodiment of the present invention.

FIG. 9 shows a process through which access to a new resource is catalogued to an existing digital library. As shown in FIG. 9, the process begins with step S900 where descriptive information regarding that resource is provided. The librarian user interface 200 will include a mechanism through which this information is requested if the librarian, or other user, is bringing new content 105 into the LUDL 301A, 301B, 301C. After the descriptive information has been provided, the process proceeds to step S901 where additional metadata for the resource is added. As would be well understood by one in the software art, metadata will facilitate the searching for a particular resource, and by adding additional metadata, the librarian can facilitate the location of a particular resource. The metadata that is added will be maintained with the digital library. Accordingly, the metadata may include not only descriptive information, such as author and subject, but also information that will be used to manage the display and prominence of the resource. For example, metadata may be used by librarians or other individuals managing their own information (e.g., via a Personal Information Space (PIS) 303) to privilege the resources in the digital library based on quality feedback received or, in the case of a PIS 303, for example, their own personal desires. Because the metadata is maintained with the digital library, different libraries accessing the same resource may have privileged those common resources differently to cater to that library's users. The present inventors have recognized that it would be advantageous if a role of the digital librarian would be to enrich the content 105 that is accessible to the library's users as well as to privilege those resources according to the feedback provided by that particular library's users.

After the additional metadata has been added at step S901, the process proceeds to step S902 where a display context is created for the new resource. In this step, an initial indentation and privileging of the resource is established. Of course, as described above, the resource may be re-privileged based on quality feedback regarding that resource received by the librarian from the users of that resource. After the display context for the resource has been created at step S902, the process proceeds to step S902 where a record is created for that resource in the digital library database 100. The librarian, or individual managing their own digital library, will place the resource at the appropriate location within the ontological hierarchy. Furthermore, the librarian will include that new resource into the appropriate specialized views (i.e., LUDL 301A, 301B, 301C, LSDL 302, PIS 303, or CV 304).

By continuously adding requested content 105 and further specializing the views into the LUDL 301A, 301B, 301C, librarians can help their user populations gain efficient access to the most recent and highest quality information available. Furthermore, different users of a LUDL 301A, 301B, 301C may access different content 105 in response to this same question. For example, librarians may create multiple local specialized digital libraries 302 for multiple clinics, each clinic serving a different demographic of patients. Accordingly, some resources may be more applicable to one patient demographic than another. As such, each clinic may access different content 105 that is most applicable to the demographic of their clientele.

The system of the present invention, therefore, addresses not only the problems caused by the Principle of Least Effort, but also the problems created by such vast quantities of information being available. By empowering librarians to tailor not only which content 105 will be accessible, but also views into the content facilitating their users' navigation through the digital library, librarians can empower their user population by providing them current, quality, and relevant information that is quickly navigated to, rather than merely providing them with an ability to search a seemingly endless supply of information.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

FIG. 10 illustrates a computer system 1001 upon which an embodiment of the present invention may be implemented. The computer system 1001 includes a bus 1002 or other communication mechanism for communicating information, and a processor 1003 coupled with the bus 1002 for processing the information. The computer system 1001 also includes a main memory 1004, such as a random access memory (RAM) or other dynamic storage device (e.g., dynamic RAM (DRAM), static RAM (SRAM), synchronous DRAM (SDRAM), and flash RAM), coupled to the bus 1002 for storing information and instructions to be executed by processor 1003. In addition, the main memory 1004 may be used for storing temporary variables or other intermediate information during the execution of instructions by the processor 1003. The computer system 1001 further includes a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, and removable magneto-optical drive). The storage devices may be added to the computer system 1001 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, such as a cathode ray tube (CRT), for displaying information to a computer user. The computer system 1001 includes input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of the data structures/information shown in FIGS. 3 and 4, or any other data stored and/or generated by the computer system 1001.

The computer system 1001 performs a portion or all of the processing steps of the invention in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1001, for driving a device or devices for implementing the invention, and for enabling the computer system 1001 to interact with a human user (e.g., a digital librarian or a digital library user). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1003 for execution. A computer readable medium may take many forms, including but not limited to, non-volatile media, volatile media, and transmission media. Non-volatile media includes, for example, optical, magnetic disks, and magneto-optical disks, such as the hard disk 1007 or the removable media drive 1008. Volatile media includes dynamic memory, such as the main memory 1004. Transmission media includes coaxial cables, copper wire and fiber optics, including the wires that make up the bus 1002. Transmission media may also take the form of acoustic or light waves, such as those generated during radio wave and infrared data communications.

Various forms of computer readable media may be involved in providing one or more sequences of one or more instructions to the processor 1003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1001 may receive the data on the telephone 10 line and use an infrared transmitter to convert the data to an infrared signal. An infrared detector coupled to the bus 1002 can receive the data carried in the infrared signal and place the data on the bus 1002. The bus 1002 carries the data to the main memory 1004, from which the processor 1003 retrieves and executes the instructions. The instructions received by the main memory 1004 may optionally be stored on a storage device 1007 or 1008 either before or after execution by the processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet. For example, the communication interface 1013 may be a network interface card to attach to any packet switched LAN. As another example, the communication interface 1013 may be an asymmetrical digital subscriber line (ADSL) card, an integrated services digital network (ISDN) card, or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to a another computer through a local network 1015 (e.g., a LAN) or through equipment operated by a service provider, which provides communication services through a communications network 1016. In preferred embodiments, the local network 1014 and the communications network 1016 preferably use electrical, electromagnetic, or optical signals that carry digital data streams. The signals through the various networks and the signals on the network link 1014 and through the communication interface 1013, which carry the digital data to and from the computer system 1001, are exemplary forms of carrier waves transporting the information. The computer system 1001 can transmit and receive data, including program code, through the network(s) 1015 and 1016, the network link 1014 and the communication interface 1013.

Obviously, numerous modifications and variations of the present invention are possible in light of the above teachings. It is therefore to be understood that within the scope of the appended claims, the invention may be practiced otherwise than as specifically described herein.

What is claimed is:

1. A method of managing a large-scale information space, comprising the steps of:

populating a digital repository with entries corresponding to nodes of an ontological hierarchy of the large-scale information space, said entries including an identification indicator, and at least one of an ontological hierarchy position indicator for the node and a location indicator of informational content available on a network and corresponding to the ontological hierarchy position;

creating a library user group associating at least one library user with a predetermined category based on a library user identification indicator;

creating a specialized view into the large-scale information space containing a subset of the ontological hierarchy that corresponds to the predetermined category; and presenting the specialized view into the large-scale information space to a selected one of the at least one library user belonging to the library user group based on the library user identification indicator received from the selected one of the at least one library user that associates the selected one of the at least one library user to the library user group.

2. The method of claim 1, wherein:

at least a portion of the network is an Internet protocol network.

3. The method of claim 1, wherein:

at least a portion of the network is the Internet.

4. The method of claim 3, wherein:

the location indicator comprises a hyperlink to an Internet address containing the informational content.

5. The method of claim 1, wherein:

the large-scale information space is a clinical digital library.

6. The method of claim 1, wherein:

the digital repository comprises a database.

7. The method of claim 1, wherein:

the digital repository comprises a link base.

8. The method of claim 1, wherein:

the specialized view comprises a hierarchy of specialized views.

9. The method of claim 1, further comprising the step of:

recording in the digital repository an entry indicating each node of the ontological hierarchy visited by a library user and at least one of an identification of the library user and a time the node was visited.

10. The method of claim 1, further comprising the steps of:

accessing a resource of informational content corresponding to a particular position of the ontological hierarchy;

recording in the digital repository an entry indicating a qualitative feedback from a user of the resource; and adjusting the specialized view so as to privilege the resource based on the qualitative feedback.

11. The method of claim 10, wherein:
the adjusting step comprises manipulating metadata maintained in the digital repository corresponding to the resource.

12. The method of claim 1, further comprising the step of:
adding new informational content available on the network to the large-scale information space.

13. The method of claim 12, wherein:
the new informational content added in the adding step replaces existing informational content.

14. A computer implemented system for managing a large-scale information space comprising:
   a digital repository populated with entries defining nodes of an ontological hierarchy of the large-scale information space, said entries each being associated with an individual node of the ontological hierarchy and having;
      an identification indicator; and
      at least one of an ontological hierarchy position indicator for the node and a location indicator of informational content available on a network and corresponding to the ontological hierarchy position;
   a processor; and
   a computer readable medium encoded with processor readable instructions that when executed by the processor implement,
      a library user group creating mechanism configured to associate at least one library user with a predetermined category based on a library user identification indicator;
   a user view specialization mechanism configured to create a specialized view into the large-scale information space containing a subset of the ontological hierarchy that corresponds to the predetermined category; and
      an ontology traversal mechanism configured to present the specialized view into the large-scale information space to a selected one of the at least one library user belonging to the library user group based on the library user identification indicator received from the selected one of the at lease one library user that associates the selected one of the at least one library user to the library user group and allow the selected one of the at least one library user to traverse the ontological hierarchy and informational content identified by the location indicator.

15. The system of claim 14, wherein:
at least a portion of the network is an Internet protocol network.

16. The system of claim 14, wherein:
at least a portion of the network is the Internet.

17. The system of claim 16, wherein:
the location indicator comprises a hyperlink to an Internet address containing the informational content.

18. The system of claim 14, wherein:
the large-scale information space is a clinical digital library.

19. The system of claim 14, wherein:
the digital repository comprises a database.

20. The system of claim 14, wherein:
the digital repository comprises a link base.

21. The system of claim 14, wherein:
the user view specialization mechanism is further configured to create a hierarchy of specialized views of the ontological hierarchy.

22. The system of claim 14, wherein:
the computer readable medium is further encoded with processor readable instructions that when executed by the processor further implements;
   a content management mechanism configured to add informational content available on the network to the large-scale information space.

23. The system of claim 22, wherein:
the content management mechanism is further configured to replace existing informational content with new informational content.

24. The system of claim 14, wherein:
the computer readable medium is further encoded with processor readable instructions that when executed by the processor further implements;
   an exactly-correct server log mechanism configured to maintain a log in the digital repository, said log containing information describing an exact traversal path of the selected one of the at least one library user through the ontological hierarchy including the node visited, and at least one of an identification of the selected one of the at least one library user, a time the node was visited, and a first external location linked to corresponding to informational content visited.

25. The system of claim 24, wherein:
the exactly correct server log mechanism is further configured to maintain in the digital repository information indicating a qualitative feedback from a user of a resource accessed by linking to informational content corresponding to a node of the ontological hierarchy.

26. A computer program product, comprising:
a computer storage medium and a computer program code mechanism embedded in the computer storage medium for causing a processor to manage a large-scale information space, the computer program code mechanism having;
a first computer code device configured to populate a database with entries defining nodes of an ontological hierarchy of the large-scale information space, said entries each being associated with an individual node of the ontological hierarchy and having;
   an identification indicator; and
   at least one of an ontological hierarchy position indicator for the node and a location indicator of informational content available on a network and corresponding to the ontological hierarchy position;
a second computer code device configured to create a library user group by associating at least one library user with a predetermined category based on a library user identification indicator;
a third computer code device configured to create a specialized view into the large-scale information space containing a subset of the ontological hierarchy that corresponds to the predetermined category; and
a fourth computer code device configured to present the specialized view into the large-scale information space to a selected one of the at least one library user belonging to the library user group based on the library user identification indicator received from the selected one of the at least one library user that associates the selected one of the at least one library user to the library user group and allow the selected one of the at least one library user to traverse the ontological hierarchy and informational content identified by the location indicator.

27. The computer program product of claim 26, wherein at least a portion of the network is an Internet protocol network.

28. The computer program product of claim 26, wherein:
at least a portion of the network is the Internet.

29. The computer program product of claim 28, wherein:
the third computer code device is further configured to traverse the informational content by hyperlinking to the Internet address of informational content identified by the location indicator.

30. The computer program product of claim 26, wherein:
the specialized view created by the second computer code device comprises a hierarchy of specialized views.

31. The computer program product of claim 26, further comprising:
a fifth computer code device configured to maintain an exactly-correct log in the digital repository, said log containing information describing an exact traversal path of the selected one of the at least one library user through the ontological hierarchy including the node visited, and at least one of an identification of the selected one of the at least one library user, a time the node was visited, and a first external location linked to corresponding to informational content visited.

32. The computer program product of claim 31, wherein:
the fourth computer code device is further configured to maintain in the digital repository information indicating a qualitative feedback from a user of a resource accessed by linking to informational content corresponding to a node of the ontological hierarchy.

33. The computer program product of claim 26, further comprising:
a fourth computer code device configured to add informational content available on the network to the large-scale information space.

34. The computer program product of claim 26, wherein:
the fourth computer code device is further configured to replace existing informational content with new informational content.

35. The computer program product of claim 26, wherein:
at least a portion of said computer program code mechanism is configured to be invoked through an application program interface.

36. A system for managing a large-scale information space, comprising:
means for populating a digital repository with entries corresponding to nodes of an ontological hierarchy of the large-scale information space, said entries including an identification indicator, and at least one of an ontological hierarchy position indicator for the node and a location indicator of informational content available on a network and corresponding to the ontological hierarchy position;
means for creating a library user group associating at least one library user with a predetermined category based on a library user identification indicator;
means for creating a specialized view into the large-scale information space containing a subset of the ontological hierarchy that corresponds to the predetermined category; and
means for presenting the specialized view into the large-scale information space to a selected one of the at least one library user belonging to the library user group based on the library user identification indicator received from the selected one of the at least one library user that associates the selected one of the at least one library user to the library user group.

* * * * *